(12) United States Patent
Kumar et al.

(10) Patent No.: US 7,418,608 B2
(45) Date of Patent: Aug. 26, 2008

(54) METHOD AND AN APPARATUS FOR MANAGING POWER CONSUMPTION OF A SERVER

(75) Inventors: Arvind Kumar, Beaverton, OR (US); David J. O'Shea, Costa Mesa, CA (US)

(73) Assignee: Intel Corporation, Santa Clara, CA (US)

( * ) Notice: Subject to any disclaimer, the term of this patent is extended or adjusted under 35 U.S.C. 154(b) by 387 days.

(21) Appl. No.: 10/871,587

(22) Filed: Jun. 17, 2004

(65) Prior Publication Data

US 2005/0283624 A1     Dec. 22, 2005

(51) Int. Cl.
    *G06F 1/26*     (2006.01)
(52) U.S. Cl. .................. 713/320; 713/300; 713/324
(58) Field of Classification Search .......... 713/300, 713/320, 340, 324
    See application file for complete search history.

(56) References Cited

U.S. PATENT DOCUMENTS

| | | | |
|---|---|---|---|
| 5,339,445 A | 8/1994 | Gasztonyi | |
| 5,560,022 A | 9/1996 | Dunstan et al. | |
| 5,842,027 A * | 11/1998 | Oprescu et al. | 713/300 |
| 6,223,056 B1 | 4/2001 | Appel | |
| 6,233,693 B1 | 5/2001 | Berglund | |
| 6,489,793 B2 | 12/2002 | Jones et al. | |
| 6,504,266 B1 | 1/2003 | Ervin | |
| 6,526,516 B1 | 2/2003 | Ishikawa et al. | |
| 6,661,671 B1 * | 12/2003 | Franke et al. | 361/752 |
| 6,925,573 B2 | 8/2005 | Bodas | |
| 6,952,782 B2 | 10/2005 | Staiger | |
| 7,185,214 B2 * | 2/2007 | Espinoza-Ibarra et al. | 713/320 |
| 7,210,048 B2 | 4/2007 | Bodas | |
| 2001/0003207 A1 | 6/2001 | Kling et al. | |
| 2002/0049920 A1 | 4/2002 | Staiger | |
| 2003/0005339 A1 | 1/2003 | Cohen et al. | |
| 2003/0020333 A1 | 1/2003 | Ying | |
| 2003/0065958 A1 | 4/2003 | Hansen et al. | |
| 2003/0084359 A1 | 5/2003 | Bresniker et al. | |

(Continued)

FOREIGN PATENT DOCUMENTS

EP      0 955 573 A1      1/1999

(Continued)

OTHER PUBLICATIONS

PCT International Search Report, International Application No. PCT/US2005/017767, international filing date May 20, 2005.

(Continued)

*Primary Examiner*—Thomas Lee
*Assistant Examiner*—Malcolm D Cribbs
(74) *Attorney, Agent, or Firm*—Blakely, Sokoloff, Taylor & Zafman LLP (57) ABSTRACT

A method and an apparatus for managing power consumption of a server have been disclosed. In one embodiment, the method includes allowing a user to set a power management policy on a server, monitoring power consumption of a plurality of blades in the server, and automatically managing power consumption of the server in response to the power consumption of the plurality of blades based on the power management policy set by the user. Other embodiments have been claimed and described.

23 Claims, 5 Drawing Sheets

U.S. PATENT DOCUMENTS

| | | | |
|---|---|---|---|
| 2003/0105984 A1* | 6/2003 | Masuyama et al. | 713/330 |
| 2003/0115000 A1 | 6/2003 | Bodas | |
| 2003/0115491 A1 | 6/2003 | Williams et al. | |
| 2003/0122429 A1 | 7/2003 | Zhang et al. | |
| 2003/0126475 A1* | 7/2003 | Bodas | 713/300 |
| 2003/0200473 A1 | 10/2003 | Fung | |
| 2004/0003303 A1 | 1/2004 | Oehler et al. | |
| 2004/0030941 A1 | 2/2004 | Barr et al. | |
| 2004/0030944 A1* | 2/2004 | Barr et al. | 713/400 |
| 2004/0104709 A1 | 6/2004 | Yamaji et al. | |
| 2004/0167732 A1* | 8/2004 | Spitaels et al. | 702/62 |
| 2004/0236969 A1 | 11/2004 | Lippert et al. | |
| 2004/0255171 A1* | 12/2004 | Zimmer et al. | 713/300 |
| 2004/0257998 A1* | 12/2004 | Chu et al. | 370/252 |
| 2004/0268166 A1 | 12/2004 | Farkas et al. | |
| 2005/0015632 A1* | 1/2005 | Chheda et al. | 713/300 |
| 2005/0055587 A1* | 3/2005 | Lee | 713/300 |
| 2005/0138346 A1* | 6/2005 | Cauthron | 713/2 |
| 2006/0265609 A1* | 11/2006 | Fung | 713/300 |

FOREIGN PATENT DOCUMENTS

WO    WO 2006/007146 A2    1/2006

OTHER PUBLICATIONS

PCT Written Opinion of the International Search Report, International Application No. PCT/US2005/017767.

PCT Written Opinion for PCT Appln No. US2006/017767, mailed Jan. 4, 2007 (5 pages).

Daniel Bovet and Marco Cesati, "Reducing Power Consumption on Your Linux Box," www.linux.oreilly.com, Nov. 29, 2000, O'Reilly & Associates, Sebastopol, CA, USA.

Office Action dated Nov. 30, 2007. Taiwan Patent Application No. 200580020187.0, filed May 20, 2005. 18 pages.

* cited by examiner

METHOD AND AN APPARATUS FOR MANAGING POWER CONSUMPTION OF A SERVER

FIELD

Embodiments of the invention relate generally to a server, and more particularly, to managing power consumption of a server.

BACKGROUND

Today, many existing servers include multiple processing modules, such as blades, bricks, or processor cards. Each processing module may include one or more processors. When a processing module is powered on, the processors in the processing module consume power and the amount of which depends on processor load, frequency, and voltage. Today's processors allow a control of this using the power states of the processors. In a typical data center, there are usually a large number of servers deployed. However, the power available is generally limited. Therefore, it is important to manage power consumption of the servers efficiently.

Currently, administrators or users in data centers have to manually assign power to a rack or a collection of systems in a server based on the maximum power consumption ratings of the systems. This causes the data centers to limit the deployment of servers because the power consumption may not be managed efficiently. Frequently, the servers are not using all the power assigned, and therefore, some of the power capacity is wasted. On the other hand, if additional servers are powered on when the already deployed servers are using all the power available, it may result in a shortage of power. Catastrophic failures of the servers may result from such power shortages.

BRIEF DESCRIPTION OF THE DRAWINGS

Embodiments of the present invention is illustrated by way of example and not limitation in the figures of the accompanying drawings, in which like references indicate similar elements and in which.

DETAILED DESCRIPTION

A method and an apparatus for managing power consumption of a server are disclosed. In the following detailed description, numerous specific details are set forth in order to provide a thorough understanding. However, it will be apparent to one of ordinary skill in the art that these specific details need not be used to practice some embodiments of the present invention. In other circumstances, well-known structures, materials, circuits, processes, and interfaces have not been shown or described in detail in order not to unnecessarily obscure the description.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
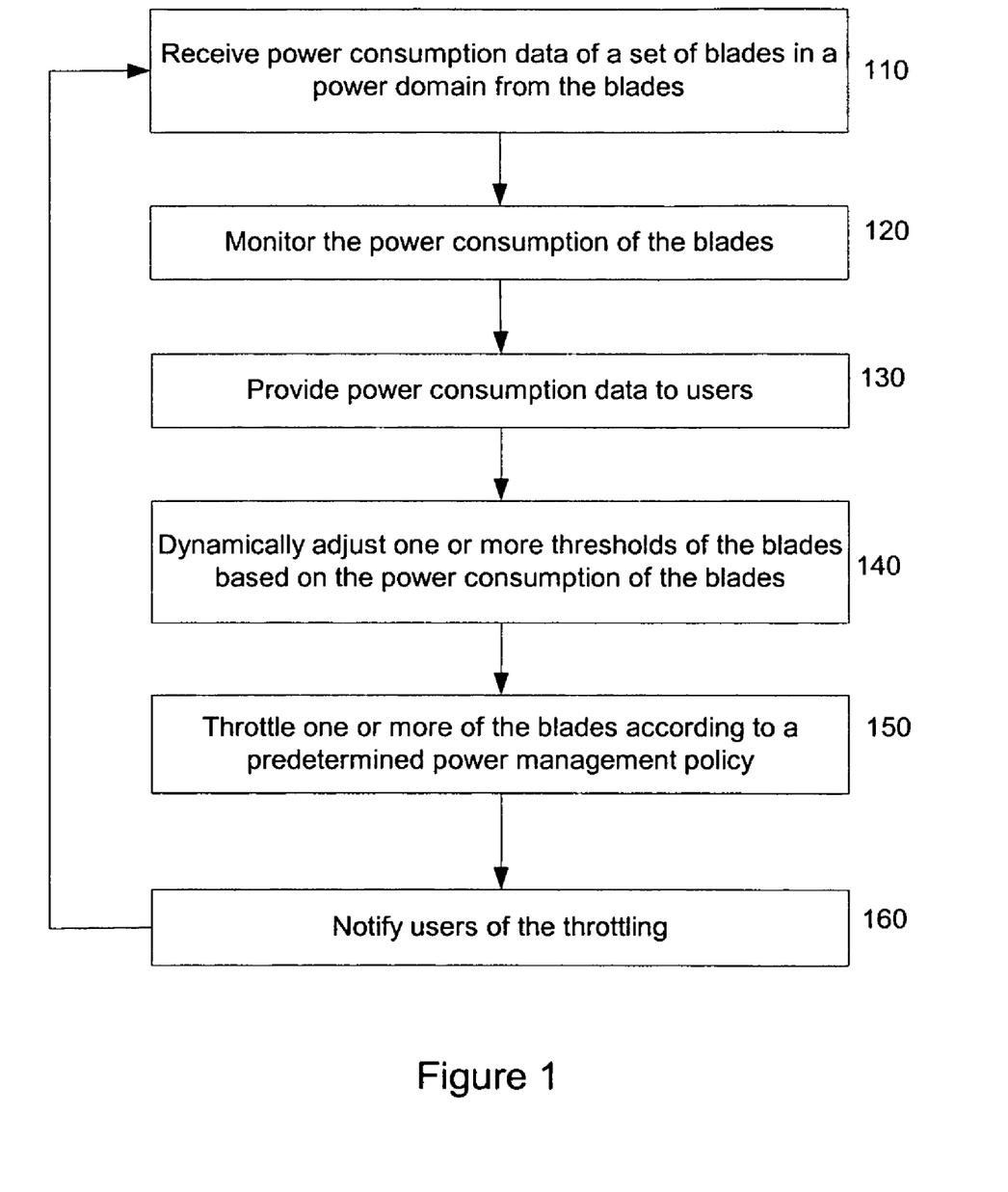
FIG. 1 shows a flow diagram of one embodiment of a process to manage power consumption of a server.

FIG. 1 shows a flow diagram of one embodiment of a process to manage power consumption of a server. In the following description, a blade server (also known as a modular server) is used as an example to illustrate the concept. However, one should appreciate that the concept disclosed is not limited to blade servers, but is applicable to other types of servers as well. For example, the concept disclosed is applicable to the scale-out high-density rack-based servers. Furthermore, the process is performed by processing logic that may comprise hardware (e.g., circuitry, dedicated logic, etc.), software (such as is run on a general purpose computer system or a dedicated machine, for example, a chassis management module (CMM) in the server), or a combination of both.

In one embodiment, one or more power domains are defined within the server. A power domain of a server is a logical domain including a group of server components, such as blades, which share the same power supply. In the following description, a power domain having a group of blades in a blade server is used as an example. Note that the technique disclosed is applicable to other types of servers having different components, such as bricks, processor cards, etc. Processing logic may manage power consumption of the server on the power domain level. The total power that can be allocated to the components in a power domain may be referred to as the power budget of the power domain. An upper limit of the power budget of the power domain may be set in a factory. However, users may modify the factory-set upper limit based on the environment in which the server is deployed. The power budget of the power domain may be distributed among the blades within the power domain in a number of ways, such as pro-rated based on the power ratings of the blades. Processing logic may compute the power thresholds of the blades based on the power distribution and program these power thresholds in the corresponding blades. More detail of power threshold computation is described below.

Referring to FIG. 1, processing logic receives power consumption data of the group of blades in the power domain (processing block 110). In one embodiment, the Blade Management Controller (BMC) of each blade sends the power consumption data of the corresponding blade to the CMM of the server. Details on how the BMCs of the blades may obtain power consumption data will be described below. Processing logic monitors the power consumption of the blades using the data received from the blades (processing block 120). Processing logic may also provide the power consumption data to users or administrators (processing block 130). Furthermore, processing logic may issue alerts when the total power consumption in the power domain is about to reach a predetermined limit, such as the upper limit of the power budget of the power domain.

Based on the power consumption data received from the blades, processing logic dynamically adjusts one or more power thresholds of the blades (processing block 140). For example, processing logic may reduce the power thresholds of the blades to cause the BMCs of the blades to set the processors on the blades to power states having lower power consumption. Detail on how the BMC may set the processors to power states having lower power consumption is discussed below. In some embodiments, the BMCs of the blades provide the lower limit on the power thresholds of the blades to the CMM of the server.

Furthermore, dynamically adjusting the power thresholds allows processing logic to manage the power budget more efficiently. For example, processing logic may have set the power threshold of a first blade in the power domain lower than the maximum power rating of the first blade when a second blade in the power domain is powered on. However, when the second blade is powered down, part of the power budget in the power domain is freed up. Thus, processing logic may relax the power threshold of the first blade because more power may now be allocated to the first blade.

In one embodiment, processing logic throttles one or more of the blades in the power domain based on a predetermined power management policy (processing block 150). To throttle a blade, processing logic may cause the processors on the blade to transition into a power state having lower power consumption. Various examples on how to throttle a blade are discussed below. In some embodiments, the predetermined power management policy is defined by users. The predetermined power management policy may apply individually to each power domain of the server. That is, if the power consumption in a power domain exceeds a predetermined limit, only the blades within the power domain may be candidates for the throttling. Furthermore, users may choose a power management policy from a set of predefined policies. Examples of power management policies include the deep cut policy and the shallow cut policy.

In one embodiment, processing logic implementing the shallow cut policy makes one pass to throttle blades in a power domain that cross their corresponding power thresholds. Processing logic then continues to go through the remaining blades in the power domain to throttle these blades until the power consumption in the power domain falls within a predetermined limit. Subsequent passes through the blades are made until the power consumption in the power domain falls within limit or until the blades cannot be additional throttled. When the blades cannot be throttled any more and the power consumption in the power domain remains higher than the predetermined limit, processing logic may start powering down the blades in the power domain. Users may set the sequence of the blades in which the blades are throttled and/or powered down. In one embodiment, processing logic adopts a default sequence that is the reverse of the sequence in which the blades have been powered on.

In addition to, or as an alternative to, the shallow cut policy described above, another exemplary power management policy is the deep cut policy. In one embodiment, processing logic implementing the deep cut policy works with one blade at a time to reduce power consumption in a power domain. Starting with the first blade in a predetermined sequence, processing logic throttles the blade to cause the power consumption in the power domain to fall. When the blade cannot be throttled any more, processing logic may power down the blade if the power consumption in the power domain remains above a predetermined limit. Furthermore, after powering down the blade, processing logic moves onto the next blade in the predetermined sequence to repeat the blade throttling, and the powering down if needed, to reduce power consumption if the power consumption in the power domain remains above the predetermined limit. Like the shallow cut policy, users may set the sequence of the blades in which the blades are throttled and/or powered down. In one embodiment, processing logic adopts a default sequence that is the reverse of the sequence in which the blades have been powered on.

Referring back to FIG. 1, processing logic may notify users when the blades are throttled (processing block 160). Processing logic may provide the users with more detail of the throttling (e.g., the degree of power throttling in percentage). In one embodiment, the BMCs in the blades get the information on the degree of throttling from the Basic Input/Output Systems (BIOS) of the blades and send the information to the CMM. Processing logic may periodically monitor the power consumption in the power domain by transitioning back to processing block 110.

Figure 2:
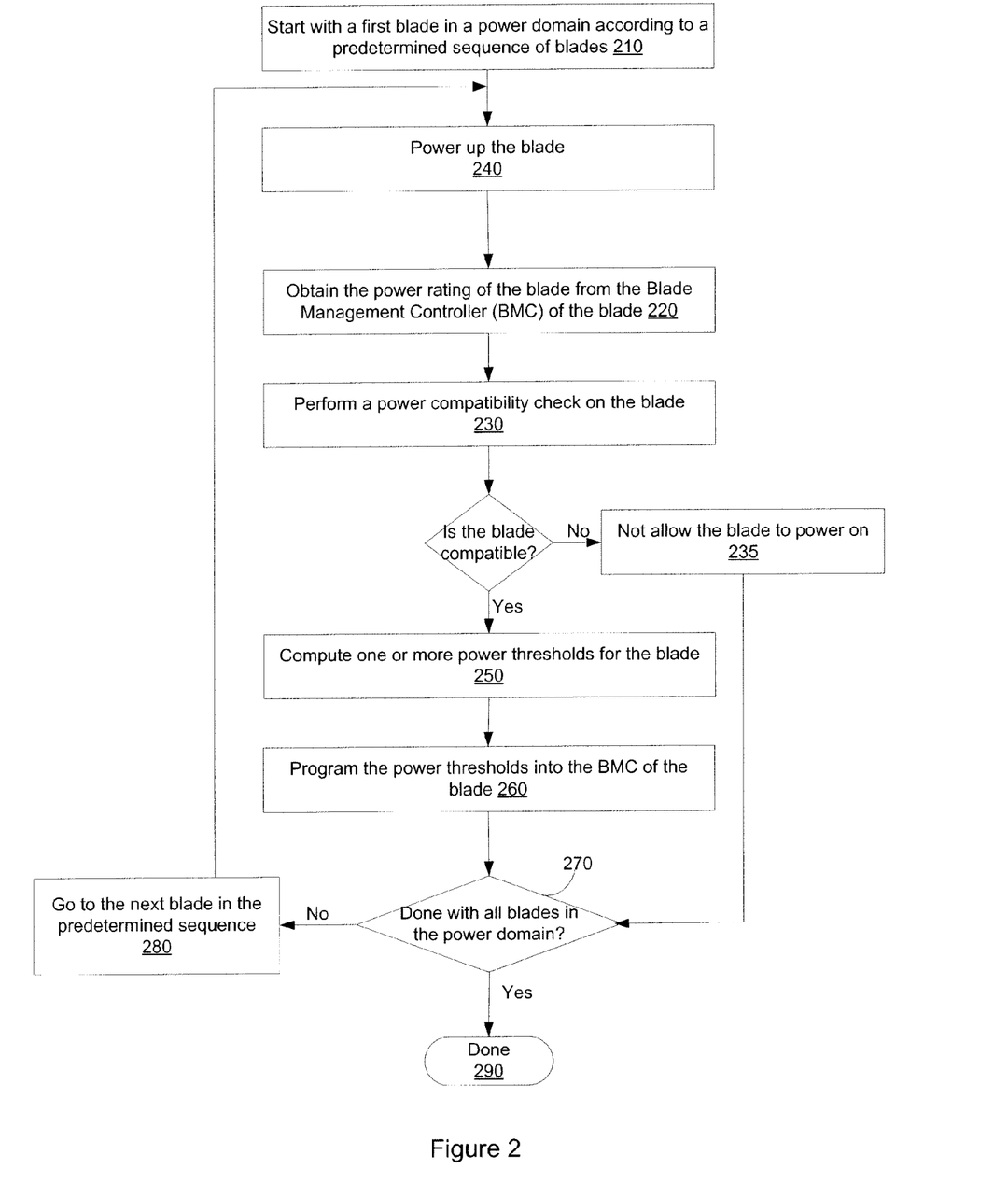
FIG. 2 shows a flow diagram of one embodiment of a process to perform power sequencing in a server.

FIG. 2 illustrates a flow diagram of one embodiment of a process for power sequencing the blades in a power domain of a server. The process is performed by processing logic that may comprise hardware (e.g., circuitry, dedicated logic, etc.), software (such as is run on a general purpose computer system or a dedicated machine, e.g., a CMM in the server), or a combination of both. In some embodiments, processing logic performs power sequencing on the blades when the server is powered up.

Processing logic goes through the blades in the power domain in a predetermined sequence. A default sequence may be provided by the CMM of the server, such as going from the least numbered blade slot in an increasing order. The default sequence may be maintained even if a new blade is inserted in an empty slot in between two existing blades. Alternatively, the CMM may include a user interface to provide an administrator option for users to specify the sequence or ordering to power on the blades. In some embodiments, a one-time override option is provided to allow users to specify a different order. When a user defined sequence is used, the new blades inserted into the server may be added at the end of the sequence.

Referring to FIG. 2, processing logic starts with a first blade in the predetermined sequence of blades in a power domain of the server (processing block 210). Processing logic powers up the blade (processing block 240). In one embodiment, processing logic obtains the power rating of the blade from the BMC of the blade (processing block 220). Processing logic may perform a power compatibility check on the blade (processing block 230). In one embodiment, processing logic performs the power compatibility check by matching the power rating of the blade against the chassis capacity for the power domain. Processing logic may not allow a blade to power on (processing block 235) if the sum of the current power domain consumption and the power rating of the blade exceeds the total power budget of the power domain. Based on the result of the power compatibility check, processing logic proceeds to processing block 250 if the blade is compatible.

Processing logic may compute one or more power thresholds for the blade (processing block 250). Then processing logic may program the power thresholds into the BMC of the blade (processing block 260).

At processing block 270, processing logic checks whether all blades in the power domain have been sequenced through. If so, the process ends (processing block 290). Otherwise, processing logic goes to the next blade in the predetermined sequence (processing block 280) and then repeats processing block 220.

In some embodiments, the user may specify a minimum delay between the powering on of consecutive blades in the predetermined sequence. Processing logic may wait for a predetermined time period (hereinafter, referred to as the "timeout") that is approximately at or longer than the minimum delay specified before powering on the next blade. Furthermore, processing logic may wait for a message from the BMC of the blade to indicate that the blade has been successfully powered on and is in stable power condition before powering on the next blade. In some embodiments, such timeout is not user configurable, but is computed by the CMM of the server based on the minimum delay and an estimate of the timeout reported by the BMC. If the BMC does not respond before this timeout expires, the CMM may generate an explicit power down request to the blade and then move onto the next blade. The CMM may also create an error log if the BMC does not respond before the timeout expires.

Alternatively, users may specify a flag to cause processing logic not to wait for an unresponsive blade. When the flag is set, processing logic may wait for only the minimum delay and then move on to power on the next blade regardless of whether the current blade is completely powered on. In some embodiments, the flag is a global flag.

Figure 3:
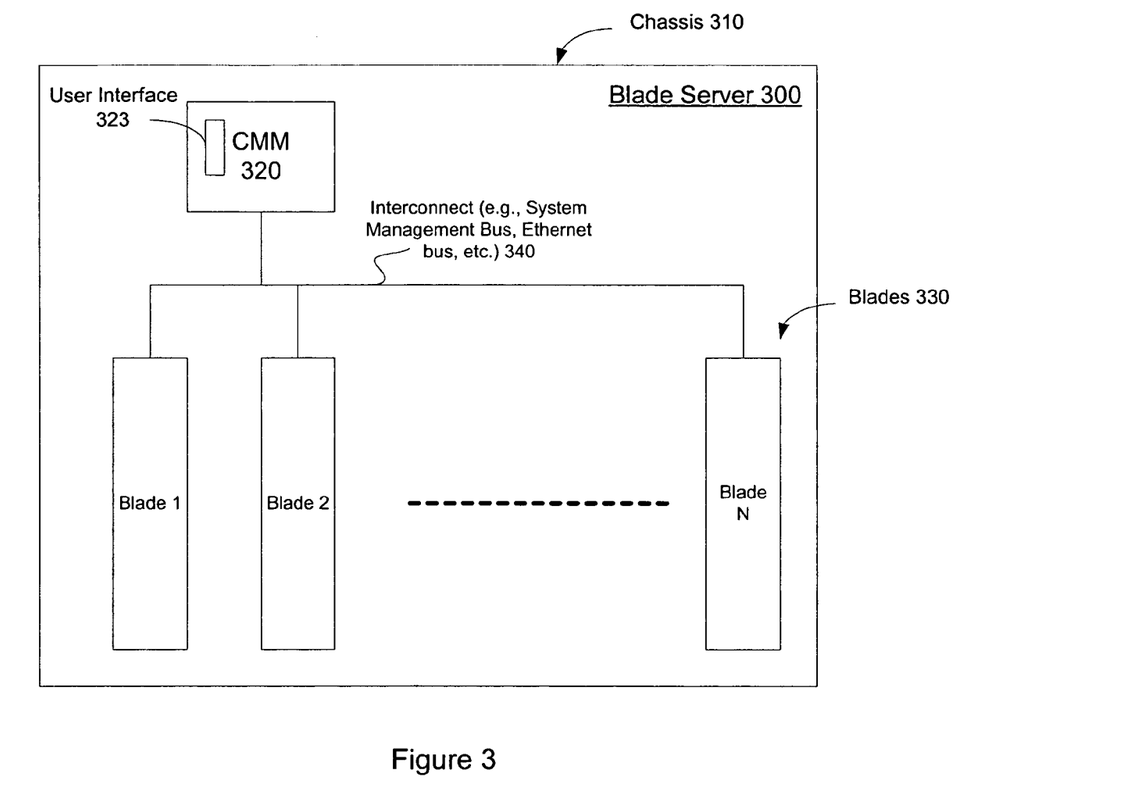
FIG. 3 illustrates one embodiment of a blade server.

FIG. 3 illustrates one embodiment of a blade server. The blade server 300 includes a chassis 310, a chassis management module (CMM) 320, a number of blades (also referred to as server blades) 330, and a number of interconnects 340. Note that any or all of the components and the associated hardware illustrated in FIG. 3 may be used in various embodiments of the blade server 300. However, it should be appreciated that other configurations of the blade server 300 may include more components (e.g., compact disk drive, floppy disk drive, etc.) or fewer components than those shown in FIG. 3.

In one embodiment, the CMM 320 is a small computer with an embedded operating system (OS) and/or some other operating environment for running application programs. However, it should be appreciated that the power management described in the current document is not limited to any particular operating system. The CMM 320 may send and receive messages to and from the blades 330. Furthermore, the CMM 320 may include a user interface 323 to allow users to set, view, and/or modify power management policies of the blade server 300. In some embodiments, the blade server 300 includes a redundant CMM in addition to the CMM 320 to protect the server against failures of the CMM 320. In general, the CMM 320 may be used for configuration of the blades 330, arbitration of the shared resources among the blades 330, and/or management of the components of the server 300.

Referring to FIG. 3, the interconnects 340 may also be referred to as the management interconnects. The interconnects 340 couple the blades 330 to the CMM 320. The interconnects 340 may include standard interconnects (e.g., Ethernet bus, i2c bus, RS 485 serial bus, fibre channel, InfiniBand, PCI-Express, etc.), proprietary interconnects (e.g., system management bus), or a combination of both. Furthermore, the protocol between the CMM 320 and the server blades 330 across the interconnects 340 may include any standard or proprietary protocol, such as Intelligent Platform Management Interface (IPMI) based protocol, Transfer Control Protocol/Internet Protocol (TCP/IP), etc.

In one embodiment, the blades 330 are independent computer systems or processing modules, each having its own components, such as one or more processors, memories, etc. The blades 330 may share some storage in a clustered environment, such as storage area network (SAN), network-attached storage (NAS), etc. Furthermore, some blades 330 may include additional components, such as on-board hard disks, or other peripheral components. Each of the blades 330 includes a Blade Management Controller (BMC), also known as a management processor. The BMC communicates with the CMM 320 using the management interconnects 340 and a predetermined protocol as described above. One exemplary embodiment of a blade is shown in detail in FIG. 4.

Figure 4:
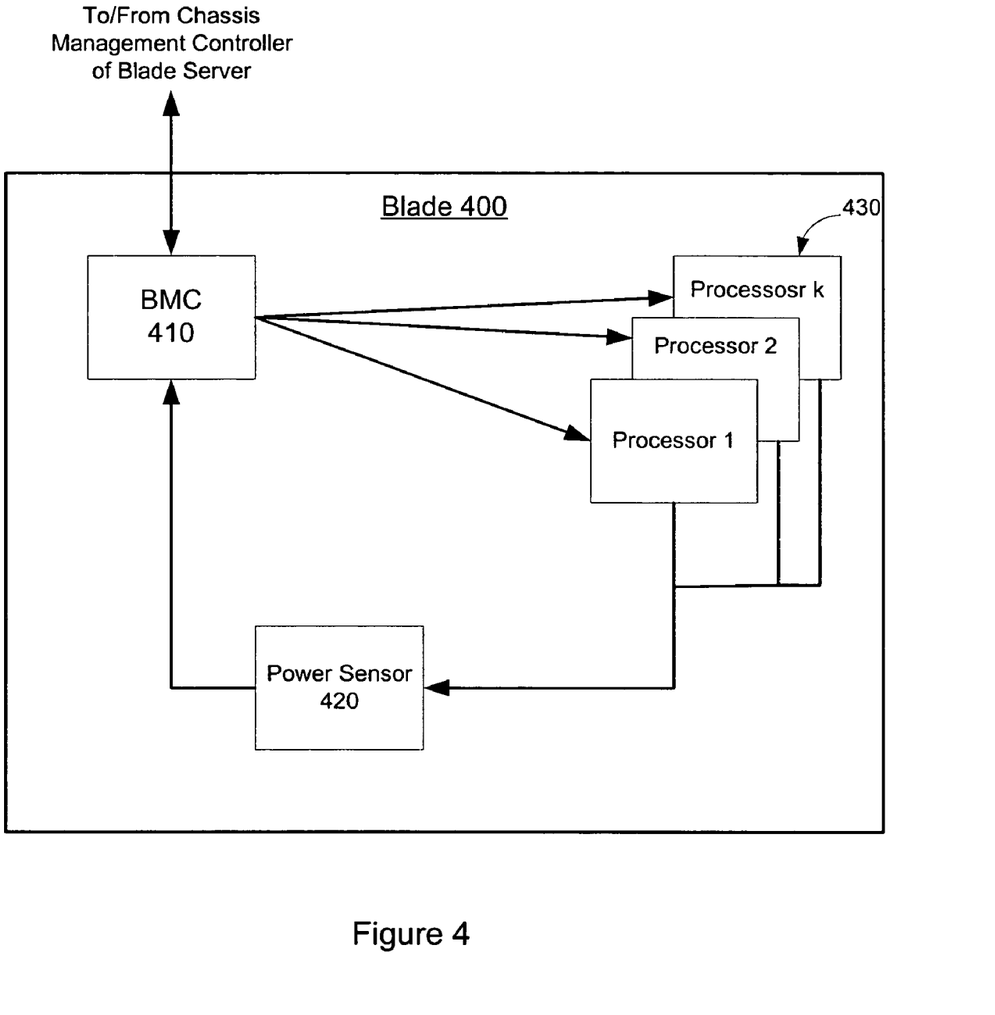
FIG. 4 illustrates one embodiment of a blade.

FIG. 4 illustrates one exemplary embodiment of a blade in a server. The blade 400 includes a Blade Management Controller (BMC) 410, a power sensor 420, and a number of processors 430. Note that the above components are shown for the purpose of illustrating the concept. Some embodiments of the blade may include more or less components than those shown in FIG. 4.

In one embodiment, the power sensor 420 monitors the power consumption of the processors 430 and inputs the power consumption data to the BMC 410. Based on the data, the BMC 410 may determine the overall power consumption of the blade 400. Furthermore, the BMC 410 may communicate with a CMM (e.g., the CMM 320 in FIG. 3) of the server regarding the power consumption of the blade 400. The BMC 410 may generate interrupts when the power consumption of the blade 400 exceeds a predetermined limit.

In one embodiment, one or more of the processors 430 support Advanced Configuration and Power Interface (ACPI) based management of processor power states (P-States). Therefore, the blade 400 may be throttled using the P-States feature of the processors 430. For example, when a processor transitions into a P-State having lower power consumption, the frequency and voltage of the processor may be lowered. Consequently, the power consumption of the processor may be reduced. In some embodiments, the BMC 410, the BIOS, and/or the OS of the blade 400 manage the P-States of the processors 430. The blade 400 may have one or more power thresholds, which are programmed in the BMC 410.

As discussed above, the blade 400 may include a power sensor 420 to sense the current power consumption of the processors in the blade 400 and to input the power consumption data to the BMC 410. When a power threshold is exceeded, the BMC 410 may generate an interrupt after having latched a power event, such as an ACPI event, in a power event hardware block. The event handler in the processors 430 may determine the cause of the interrupt and modify the working variables used for response reporting by various subroutines, such as, for example, _PSS,_PCT, and _PPC subroutines. The event handler may also post a power-event Notify to the OS Power Management Module (OSPM). In response to the power-event Notify, the OSPM may call the _PPC subroutine to determine the new maximum allowed power state levels for the corresponding processor. As a result, the OS policy calculation may generate a new maximum power state for the processors 430, which causes the P-State control hardware to lower the P-State of the processors 430.

In an alternate embodiment, the BIOS code of the blade 400 directly changes the processor P-State in one or more interrupt handlers (e.g., SMI handler, PMI handler, etc.) of the processors 430 if the OS of the blade 400 does not support ACPI based management of P-State. The interrupt handlers may change the state of the processors 430 on the blade to the same P-State.

The factory default setting of the BMC 410 of the blade 400 may have the upper power threshold set to approximately the maximum power allowed. Such an upper power threshold effectively disables the ACPI feature until the CMM of the server initializes the power thresholds to a different value. Likewise, the CMM may also disable the ACPI feature by changing the upper power threshold to be substantially equal to the maximum allowed amount.

In one embodiment, the BMC 410 notifies the CMM of the server of an event when the processors 430 on the blade 400 are throttled. When the CMM receives the event, the CMM looks at the overall power consumption by the rest of the blades in the corresponding power domain. If the other blades are not consuming power and the power budget of the power domain has not been exhausted yet, then there is room for the CMM to allocate more power to the throttled blade 400. Hence, the CMM may relax the power threshold of the throttled blade 400 to enable the processors 430 to go into a P-State having higher power consumption.

Figure 5:
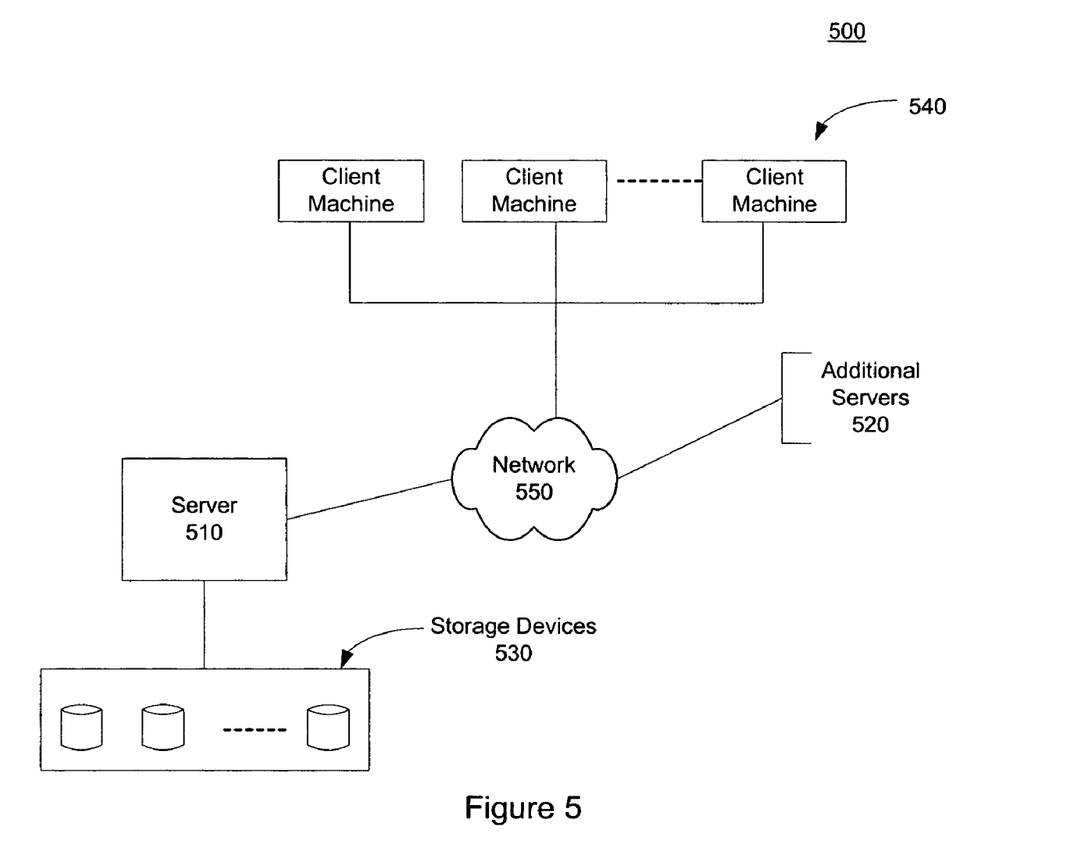
FIG. 5 illustrates an exemplary embodiment of a networked system.

FIG. 5 shows an exemplary networked system. The system 500 includes a server 510, a number of storage devices 530 (e.g., disks), and a number of client machines 540 (e.g., personal computers, workstations, etc.). The client machines 540 may be coupled to the server 510 via a network 550, which may include a local area network (LAN), a wide area network (WAN), etc. The storage devices 530 may be coupled to the server 510 via various kinds of interconnects, such as, for example, fibre channel, Ethernet busses, etc. In some embodiments, there are additional servers 520 coupled to the network 550. Note that the above components are shown for the purpose of illustrating the concept. Some embodiments of the system 500 may include more or less components than those shown in FIG. 5.

In one embodiment, the server 510 includes a number of blades and a CMM. The blades may be grouped into one or more power domains. Each blade in a power domain may include a BMC, which is communicably coupled to the CMM. The BMC collects power consumption data of the blade and sends the data to the CMM. Using the data from the BMC of each of the blades, the CMM manages power consumption of the server on the power domain level. The CMM may dynamically adjust the power thresholds of the blades to improve the efficiency of power allocation among the blades and/or to reduce the power consumption of the blades. Furthermore, the CMM may throttle the blades to reduce power consumption when the power consumption has exceeded some predetermined limits.

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description below. In addition, the present invention is not described with reference to any particular programming language. It will be appreciated that a variety of programming languages may be used to implement the teachings of the invention as described herein. A machine-accessible medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method comprising:
   allowing a user to set a power management policy on a server;
   monitoring power consumption of a plurality of blades in the server;
   automatically managing power consumption of the server in response to the power consumption of the plurality of blades based on the power management policy set by the user;
   powering on the plurality of blades sequentially; and
   performing a power compatibility check on each of the plurality of blades after powering on a corresponding blade and before powering on a next blade, wherein the plurality of blades are in a power domain and performing the power compatibility check on each of the plurality of blades comprises
   obtaining a power rating of the corresponding blade from a blade management controller within the corresponding blade, and
   checking the power rating against overall available power for the power domain.

2. The method of claim 1, further comprising waiting a predetermined period of time before powering on the next blade.

3. The method of claim 1, wherein automatically managing the power consumption of the server comprises:
   programming one or more power thresholds into each of the plurality of blades; and
   dynamically adjusting the power thresholds in response to the power consumption of the plurality of blades.

4. The method of claim 3, wherein automatically managing the power consumption of the server comprises:
   throttling one or more of the plurality of blades to reduce the power consumption of the plurality of blades if the power consumption of the plurality of blades exceeds a predetermined limit; and
   relaxing the one or more power thresholds of one of the plurality of blades to allow performance of the one blade to be improved if available power for the one blade increases.

5. The method of claim 4, wherein throttling one or more of the plurality of blades comprises:
   causing one or more processors on the one or more of the plurality of blades to transition into a power state having lower power consumption.

6. The method of claim 4, further comprising:
   throttling each of the plurality of blades until the power consumption of the plurality of blades falls below the predetermined limit.

7. The method of claim 1, further comprising:
   throttling a blade having a power consumption over a power threshold of the blade; and
   powering down the blade if throttling the blade fails to cause the power consumption of the plurality of blades to fall below the predetermined limit, wherein automatically managing the power consumption of the server comprises
   programming one or more power thresholds into each of the plurality of blades, and
   dynamically adjusting the power thresholds in response to the power consumption of the plurality of blades.

8. A machine-accessible medium that provides instructions that, if executed by a processor, will cause the processor to perform operations comprising:
   allowing a user to set a power management policy on a server;
   monitoring power consumption of a plurality of blades in the server;
   automatically managing power consumption of the server in response to the power consumption of the plurality of blades based on the power management policy set by the user;
   powering on the plurality of blades sequentially; and
   performing a power compatibility check on each of the plurality of blades after powering on a corresponding blade and before powering on a next blade, wherein the plurality of blades are in a power domain and performing the power compatibility check on each of the plurality of blades comprises
   obtaining a power rating of the corresponding blade from a blade management controller within the corresponding blade, and
   checking the power rating against overall available power for the power domain.

9. The machine-accessible medium of claim 8, wherein the operations further comprise:
   receiving power consumption data of the plurality of blades from a plurality of blade management controllers in the plurality of blades;
   automatically throttling one or more of the plurality of blades to reduce power consumption of the plurality of blades in response to the data received based on the power management policy; and
   powering down one or more of the plurality of blades if throttling one or more of the plurality of blades fails to lower the power consumption of the plurality of blades below a predetermined limit.

10. The machine-accessible medium of claim 8, wherein the plurality of blades are in a power domain and the operations further comprise:
   dynamically adjusting one or more power thresholds of the plurality of blades in response to the power consumption of the plurality of blades, comprising
   relaxing the one or more power thresholds of the plurality of blades if power available for the power domain increases.

11. The machine-accessible medium of claim 8, wherein the operations further comprise allowing the user to modify the power management policy after setting the power management policy.

12. An apparatus comprising:
   a plurality of interconnects;
   a plurality of blades in a power domain, each of the plurality of blades comprising a blade management controller, one or more processors, and a power sensor coupled between the one or more processors and the management controller; and
   a chassis management module (CMM), coupled via the plurality of interconnects to the plurality of blades, to communicate with the blade management controller of each of the plurality of blades in order to monitor and to automatically manage power consumption of the plurality of blades, wherein the CMM includes a user interface to allow users to set a power management policy, wherein the CMM is operable to power on the plurality of blades sequentially, to perform a power compatibility check on each of the plurality of blades after powering on a corresponding blade and before powering on a next blade by
   obtaining a power rating of the corresponding blade from the blade management within the corresponding blade, and
   checking the power rating against overall available power for the power domain.

13. The apparatus of claim 12, wherein the CMM is operable to automatically manage power consumption of the plurality of blades based on the power management policy set.

14. The apparatus of claim 12, wherein the power sensor is operable to sense power consumption of the one or more processors and to input power consumption data to the blade management controller.

15. The apparatus of claim 12, wherein the plurality of interconnects comprises one or more Ethernet busses.

16. The apparatus of claim 12, wherein the plurality of interconnects comprises one or more system management busses.

17. A system comprising:
   one or more storage devices;
   one or more client machines; and
   a server, coupled between the one or more storage devices and the one or more client machines, to perform operations on the one or more storage devices in response to requests from the one or more client machines, the server comprising:
   a plurality of interconnects;
   a plurality of blades, each of the plurality of blades comprising a blade management controller, one or more processors, and a power sensor coupled between the one or more processors and the management controller; and
   a chassis management module (CMM), coupled via the plurality of interconnects to the plurality of blades, to communicate with the blade management controller of each of the plurality of blades in order to monitor and to automatically manage power consumption of the plurality of blades, wherein the CMM includes a user interface to allow users to set a power management policy, wherein the CMM is operable to power on the plurality of blades sequentially, to perform a power compatibility check on each of the plurality of blades after powering on a corresponding blade and before powering on a next blade by obtaining a power rating of the corresponding blade from the blade management within the corresponding blade, and checking the power rating against overall available power for the power domain.

18. The system of claim 17, wherein the CMM is operable to automatically manage power consumption of the plurality of blades based on the power management policy set.

19. The system of claim 17, wherein the power sensor is operable to sense power consumption of the one or more processors and to input power consumption data of the one or more processors to the blade management controller.

20. The system of claim 17, wherein the plurality of interconnects comprises one or more Ethernet busses.

21. The system of claim 17, wherein the plurality of interconnects comprises one or more system management busses.

22. The method of claim 7, wherein throttling one or more of the plurality of blades comprises:

causing one or more processors on the one or more of the plurality of blades to transition into a power state having lower power consumption.

23. The method of claim 7, further comprising:

throttling each of the plurality of blades until the power consumption of the plurality of blades falls below the predetermined limit.

* * * * *